US012388213B2

(12) United States Patent
Oishi et al.

(10) Patent No.: US 12,388,213 B2
(45) Date of Patent: Aug. 12, 2025

(54) JOINT CONNECTOR

(71) Applicant: Yazaki Corporation, Tokyo (JP)

(72) Inventors: Kozo Oishi, Makinohara (JP); Tomoyoshi Fukaya, Makinohara (JP); Jun Ishikawa, Tokyo (JP)

(73) Assignee: Yazaki Corporation, Tokyo (JP)

( * ) Notice: Subject to any disclaimer, the term of this patent is extended or adjusted under 35 U.S.C. 154(b) by 294 days.

(21) Appl. No.: 18/353,379

(22) Filed: Jul. 17, 2023

(65) Prior Publication Data

US 2024/0063571 A1 Feb. 22, 2024

(30) Foreign Application Priority Data

Aug. 17, 2022 (JP) ................................ 2022-130186

(51) Int. Cl.
*H01R 13/514* (2006.01)
*H01R 13/405* (2006.01)
*H01R 13/434* (2006.01)

(52) U.S. Cl.
CPC ......... *H01R 13/514* (2013.01); *H01R 13/405* (2013.01); *H01R 13/434* (2013.01); *H01R 2201/26* (2013.01)

(58) Field of Classification Search
CPC ................ H01R 13/514; H01R 13/405; H91R 2201/26
USPC .............. 439/701, 89, 271, 278, 283, 95, 97
See application file for complete search history.

(56) References Cited

U.S. PATENT DOCUMENTS 5,433,628 A * 7/1995 Sadaishi ............ H01R 13/5202 439/736
5,941,716 A * 8/1999 Yoshigi ................. F16K 27/003 439/95
2010/0178784 A1* 7/2010 Shimizu ................... H01R 4/64 439/95
2014/0220792 A1 8/2014 Omori et al.
2016/0329651 A1* 11/2016 Yamaguchi ............ H01R 13/44
2017/0098904 A1* 4/2017 Kim ....................... H01R 13/73
2021/0318364 A1* 10/2021 Kawaguchi ............ G01R 1/203
2024/0055782 A1* 2/2024 Tanaka ................. H01R 31/085
2024/0063569 A1* 2/2024 Oishi ..................... H01R 43/18
2024/0364067 A1* 10/2024 Kobayashi ........... H01R 31/085
2025/0038461 A1* 1/2025 Oishi ................... H01R 13/405

FOREIGN PATENT DOCUMENTS

JP 2013-065502 A 4/2013

* cited by examiner

*Primary Examiner* — Tulsidas C Patel
(74) *Attorney, Agent, or Firm* — Banner & Witcoff, Ltd.

(57) ABSTRACT

There is provided a joint connector including: a ground terminal member integrally formed by a plate-shaped fixing portion fixed to a ground portion, a body horizontal plate portion extending from the plate-shaped fixing portion, a body rising plate portion formed by bending in a rising direction, a terminal connection portion provided formed with a plurality of terminal connecting portions electrically connectable with a counterpart terminal, and a coupling piece; and a housing integrally formed by a housing body portion in which the body rising plate portion and the terminal connection portion are insert-molded in a state where the plurality of terminal connecting portions are protruded for connecting the counterpart terminal, and a reinforcing rib portion provided to couple a resin portion covering the coupling piece and a resin portion covering the terminal connection portion.

4 Claims, 7 Drawing Sheets

JOINT CONNECTOR

CROSS-REFERENCE TO RELATED APPLICATIONS

This application is based on and claims priority under 35 USC 119 from Japanese Patent Application No. 2022-130186 filed on Aug. 17, 2022, the contents of which are incorporated herein by reference.

TECHNICAL FIELD

The present disclosure relates to a joint connector.

BACKGROUND ART

A known joint connector for collectively connecting a plurality of electric wires to a ground portion of a vehicle includes: a conductive plate (ground terminal member) having a body side grounding portion (plate-shaped fixing portion) which is fixed to a body (ground portion) of the vehicle by screws, and a connecting portion at one end of the body side grounding portion in which a plurality of terminal connecting portions to which wire-side terminals (counterpart terminals) are electrically connected are formed; and a resin housing in which the conductive plate is insert-molded (for example, see JP2013-065502 A).

The conductive plate is formed by integrally forming the body side grounding portion and the connecting portion by pressing a conductive metal plate. A bolt hole through which a ground bolt can be inserted is formed in the body side grounding portion. The connecting portion has a connection portion that forms a substantially horizontal U-shape, and the plurality of terminal connecting portions are formed to protrude from a side edge of the connection portion. The connection portion is coupled to one end of the body side grounding portion via a step portion (bent portion) rising upward from the side edge of the body side grounding portion.

Finally, the connection portion and a part of the step portion of the conductive plate are insert-molded in the housing.

However, in the joint connector described above, vibration is applied to the joint connector due to vibration during traveling and the like of the vehicle, and the joint connector swings around the step portion, which is the bent portion of the conductive plate. Then, elastic deformation repeatedly occurs at the step portion (bent portion) of the conductive plate, and deformation and breakage may occur in the step portion.

SUMMARY OF INVENTION

The present disclosure provides a joint connector capable of preventing deformation and breakage occurring in a bent portion of a ground terminal member.

According to an illustrative aspect of the present disclosure, a joint connector includes: a ground terminal member made of a conductive metal; and a housing made of an insulating resin. The ground terminal member includes: a plate-shaped fixing portion that is fixed to a ground portion of a vehicle; a body horizontal plate portion that extends from the plate-shaped fixing portion; a body rising plate portion that is formed by bending the body horizontal plate portion in a rising direction at a bent portion; a terminal connection portion that is provided above the body rising plate portion and that is formed with a plurality of terminal connecting portions electrically connectable with a counterpart terminal; and a coupling piece that is continuously provided with the body horizontal plate portion. The ground terminal member is configured by integrally forming the plate-shaped fixing portion, the body horizontal plate portion, the body rising plate portion, the terminal connection portion, and the coupling piece. The housing includes: a housing body portion in which the body rising plate portion and the terminal connection portion are insert-molded in a state in which the plurality of terminal connecting portions are protruded for connecting the counterpart terminal; and a reinforcing rib portion provided to couple a first resin portion covering the coupling piece and a second resin portion covering the terminal connection portion. The housing is configured by integrally forming the housing body portion and the reinforcing rib portion.

The present disclosure is briefly described above. Further, details of the present disclosure will be further clarified by reading through a mode for carrying out the disclosure described below (hereinafter referred to as an "embodiment") with reference to the accompanying drawings.

DESCRIPTION OF EMBODIMENTS

A specific embodiment of the present disclosure will be described below with reference to the drawings.

Figure 1:
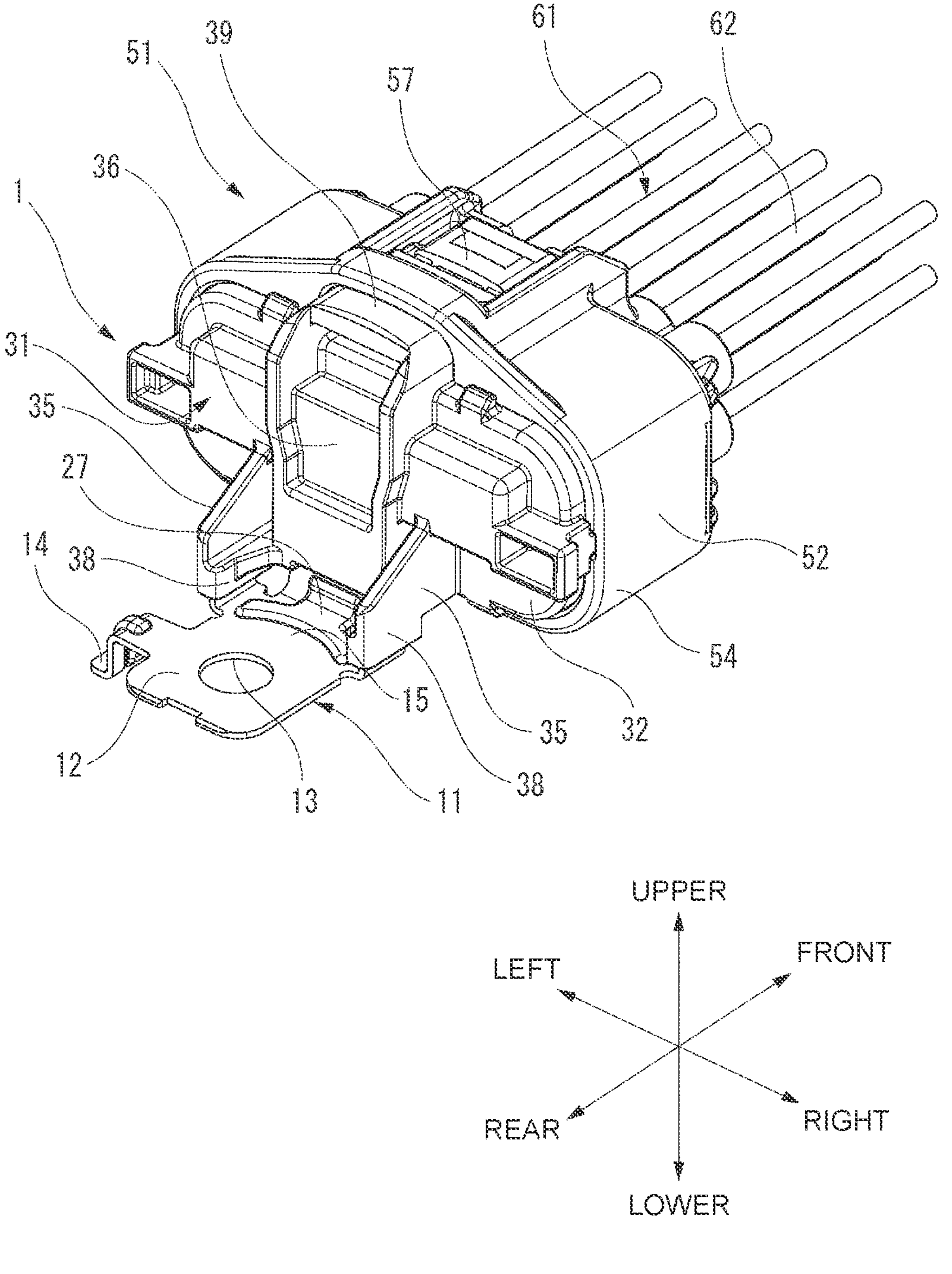
FIG. 1 is a perspective view of a joint connector according to an embodiment of the present disclosure to which a counterpart connector is fitted.
Figure 2:
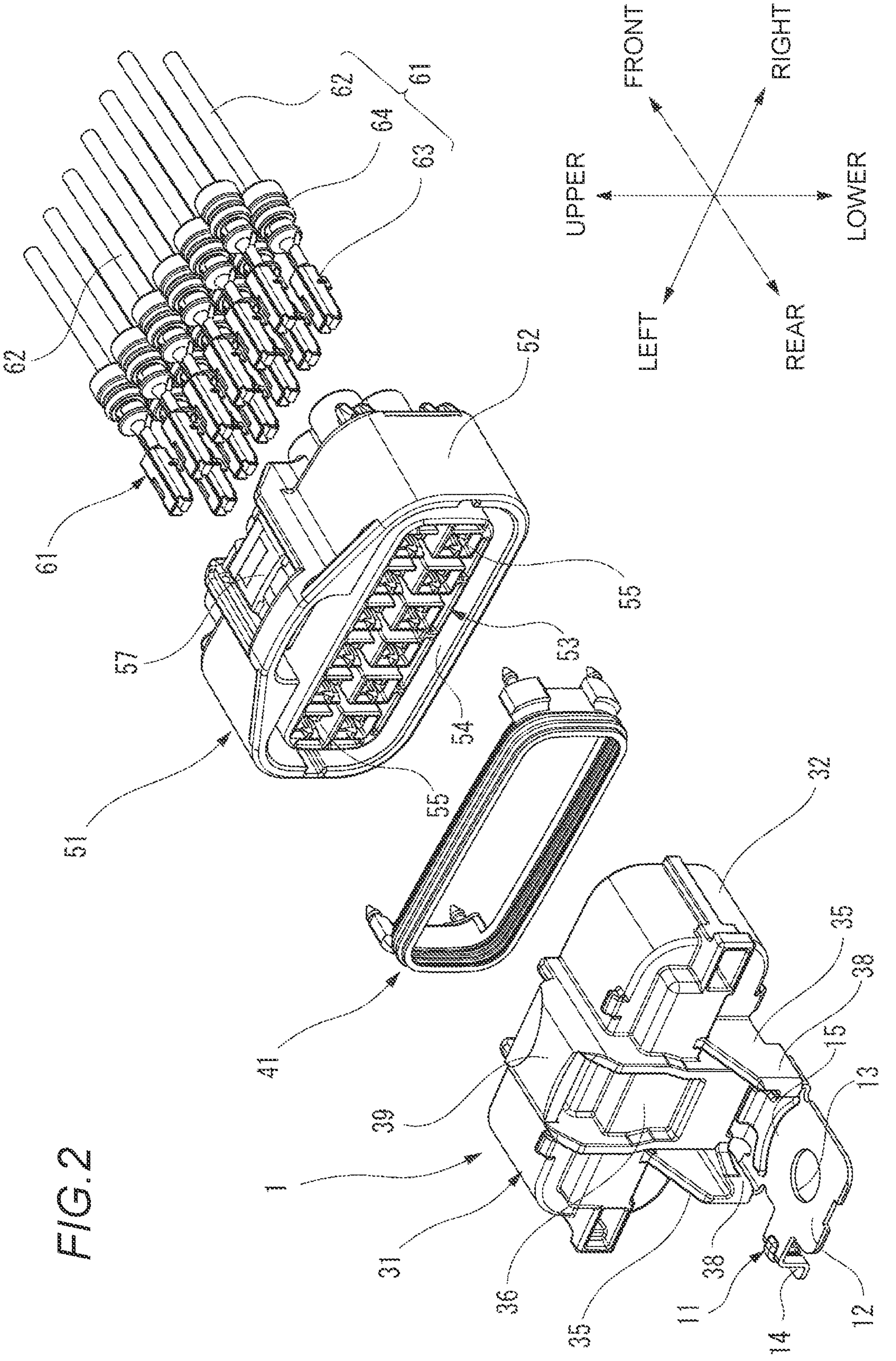
FIG. 2 is an exploded perspective view of the joint connector and the counterpart connector shown in FIG. 1.

FIG. 1 is a perspective view of a joint connector 1 according to an embodiment of the present disclosure to which a counterpart connector 51 is fitted. FIG. 2 is an exploded perspective view of the joint connector 1 and the counterpart connector 51 shown in FIG. 1.

Note that, in the present description, a front-rear direction, an upper-lower direction, and a left-right direction of the joint connector 1 follow directions of arrows shown in FIG. 1. That is, the front-rear direction is a direction along a connector fitting direction of the joint connector 1, and a side to which a counterpart housing 52 is fitted is defined as a front side of a housing 31. Further, the upper-lower direction is a short direction of the housing 31 orthogonal to the connector fitting direction of the flat rectangular parallelepiped joint connector 1, and a lock portion 39 side of the housing 31 is defined as an upper side. Further, the left-right direction is a longitudinal direction of the housing 31 orthogonal to the connector fitting direction of the joint connector 1.

As shown in FIGS. 1 and 2, the counterpart connector 51 is fitted to the joint connector 1 according to the present embodiment.

The joint connector 1 includes a ground terminal member 11 made of conductive metal and the housing 31 made of an insulating resin. The counterpart connector 51 includes terminal-attached electric wires 61, a counterpart housing 52 made of an insulating resin, and an annular packing 41.

Figure 3:
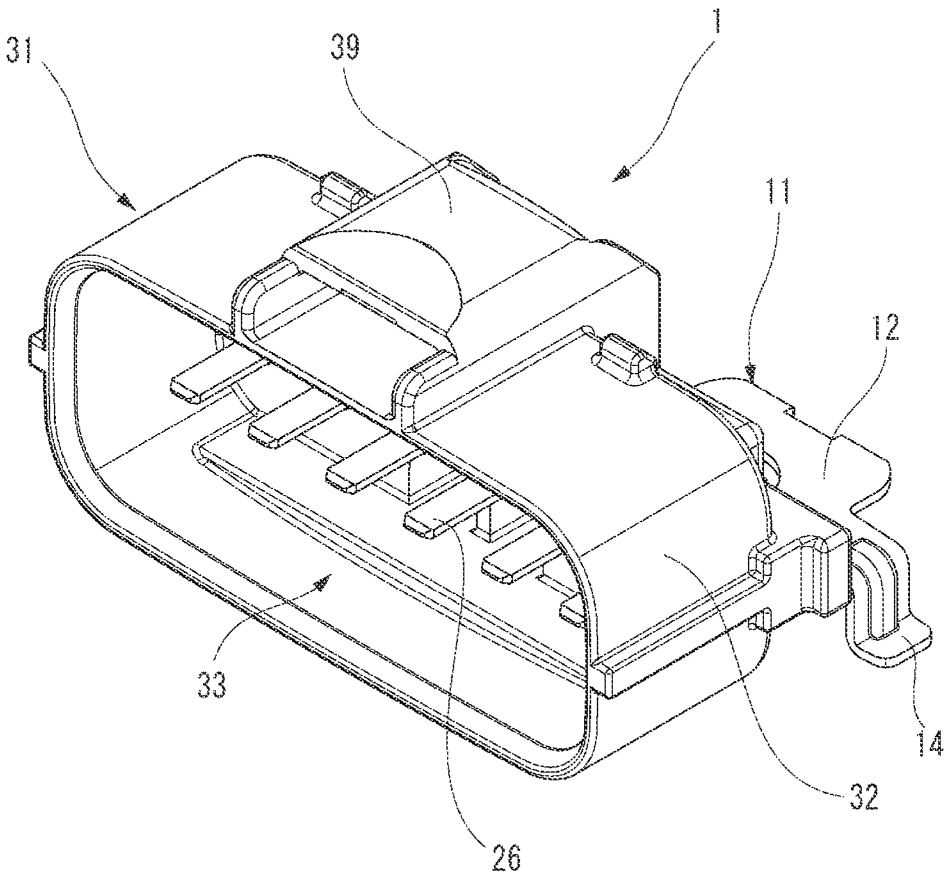
FIG. 3 is a perspective view of the joint connector shown in FIG. 2 as viewed from a front side.

A fitting recessed portion 33 is formed in the housing 31 so that a front end side is open, which is the front side in the fitting direction with the counterpart connector 51 (see FIG. 3). As shown in FIG. 2, a counterpart fitting portion 53 is formed on a front end side of the counterpart housing 52 to be fitted to the joint connector 1. The counterpart connector 51 is fitted to the joint connector 1 by fitting the counterpart fitting portion 53 of the counterpart housing 52 into the fitting recessed portion 33 of the housing 31.

As shown in FIG. 2, a plurality of terminal accommodating chambers 55 are formed in the counterpart fitting portion 53 of the counterpart housing 52. The terminal accommodating chambers 55 are formed along the fitting direction with the joint connector 1. The terminal accommodating chambers 55 are arranged in a left-right width direction of the counterpart housing 52, and are arranged in two stages in the upper-lower direction. The counterpart fitting portion 53 has lance portions 56 protruding into respective terminal accommodating chambers 55 (see FIG. 7). A lock arm 57 is formed on an upper face of the counterpart housing 52.

The counterpart housing 52 has a hood portion 54 around the counterpart fitting portion 53, and an annular packing 41 is fitted into the hood portion 54. When the counterpart fitting portion 53 of the counterpart housing 52 is fitted into the fitting recessed portion 33 of the housing 31, the annular packing 41 stops water not to enter a part between the fitting recessed portion 33 and the counterpart fitting portion 53.

A counterpart terminal 63 of the terminal-attached electric wire 61 is accommodated in the terminal accommodating chamber 55 from a rear side of the counterpart housing 52. The counterpart terminal 63 is formed of, for example, a conductive metal material such as copper or a copper alloy, and is crimped and conductively connected to a terminal of an electric wire 62 in which periphery of a conductor is covered with an outer sheath.

The counterpart terminal 63 is locked to the lance portion 56 by being inserted into the terminal accommodating chamber 55 from the rear side of the counterpart housing 52. As a result, the counterpart terminal 63 is held in a state of being accommodated in the terminal accommodating chamber 55.

A waterproof plug 64, which is a cylindrical packing, is fitted to a terminal of the electric wire 62. When the terminal of the electric wire 62 is inserted into the terminal accommodating chamber 55, the waterproof plug 64 comes into close contact with an inner peripheral face of the terminal accommodating chamber 55 to waterproof a space between inner peripheral face and the electric wire 62 in a watertight manner.

Figure 4:
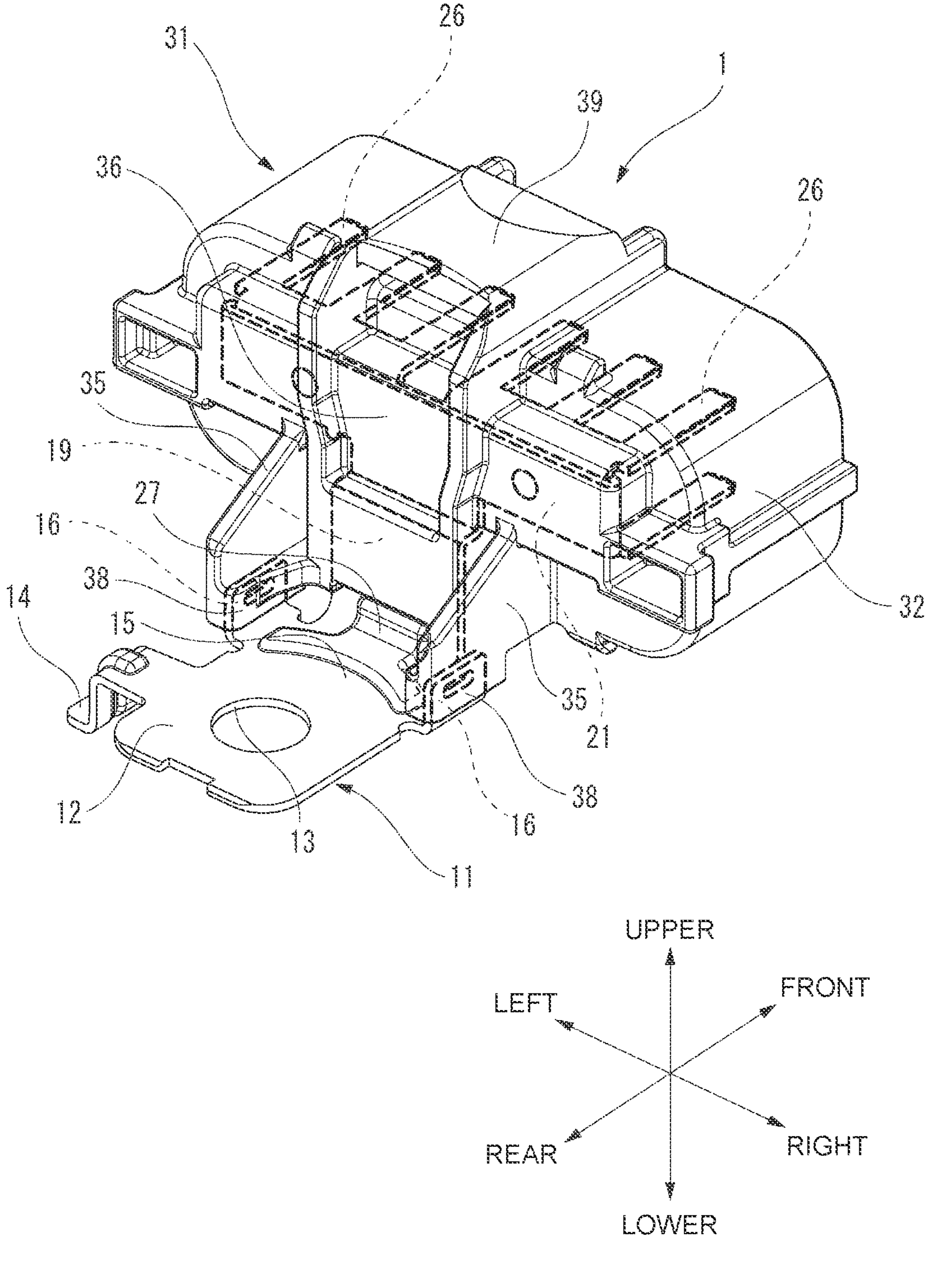
FIG. 4 is a perspective view of the joint connector in which a ground terminal member is insert-molded in a housing.
Figure 5:
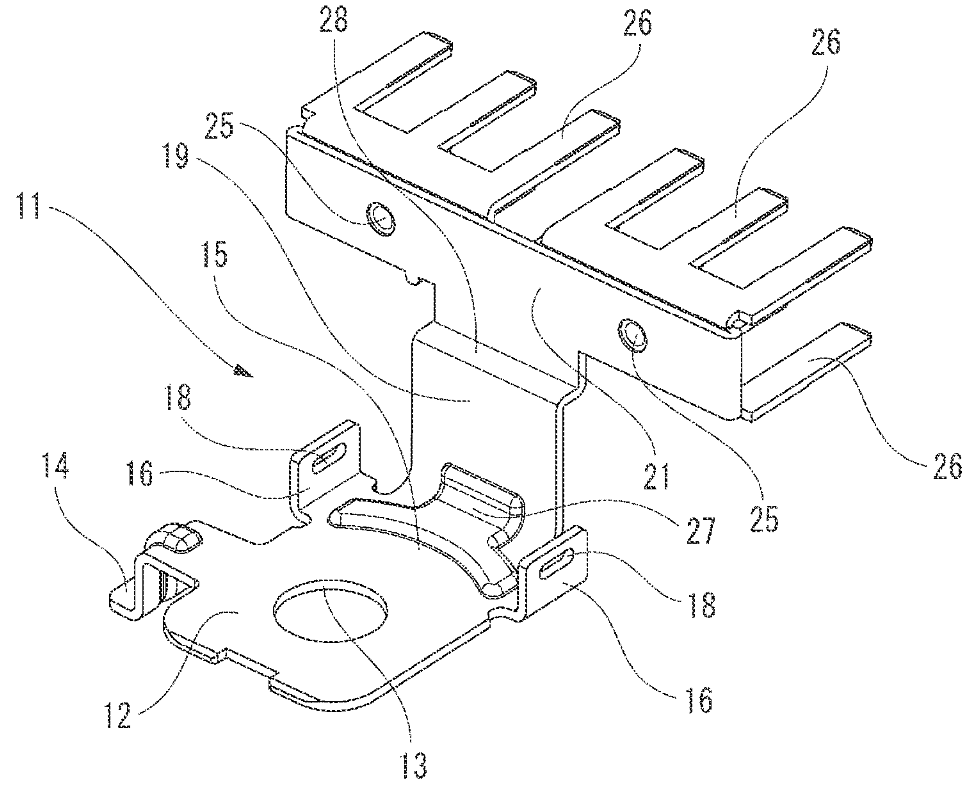
FIG. 5 is a perspective view of the ground terminal member as viewed from a rear upper side.
Figure 6:
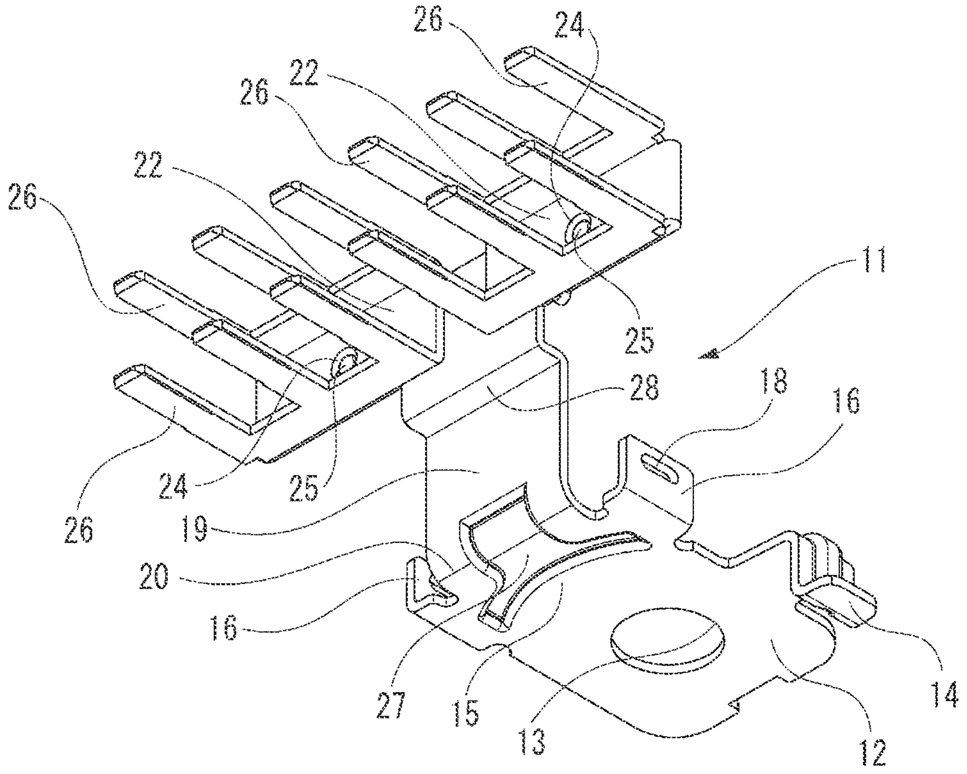
FIG. 6 is a perspective view of the ground terminal member as viewed from a front lower side.

FIG. 3 is a perspective view of the joint connector shown 1 in FIG. 2 as viewed from the front side. FIG. 4 is a perspective view of the joint connector 1 in which the ground terminal member 11 is insert-molded in the housing 31. FIG. 5 is a perspective view of the ground terminal member 11 as viewed from a rear upper side. FIG. 6 is a perspective view of the ground terminal member 11 as viewed from a front lower side.

As shown in FIGS. 3 and 4, in the joint connector 1, the ground terminal member 11 is insert-molded in the housing 31.

As shown in FIGS. 5 and 6, the ground terminal member 11 is integrally formed with a plate-shaped fixing portion 12, a body horizontal plate portion 15 extending from the plate-shaped fixing portion 12, a body rising plate portion 19 extending from the body horizontal plate portion 15, a terminal connection portion 21 provided above the body rising plate portion 19, a crank-shaped bent portion 28 formed by bending the body rising plate portion 19 in the vicinity of the terminal connection portion 21 in a crank shape, and coupling pieces 16 continuously provided on left and right side edges of the body horizontal plate portion 15 and protruding upward.

A bolt through hole 13 is formed in the plate-shaped fixing portion 12. The plate-shaped fixing portion 12 is screwed and fixed to a body 100, which is a ground portion of the vehicle, by fastening a stud bolt 71 inserted into the bolt through hole 13 to the body 100 with a nut 73. Thus, the ground terminal member 11 is grounded to the body 100. A rotation prevention piece 14 is formed in a part of the plate-shaped fixing portion 12. The rotation prevention piece 14 restricts, by engaging with a step or a hole portion around a ground surface to which the plate-shaped fixing portion 12 is screwed and fixed, rotation of the plate-shaped fixing portion 12 with respect to the ground surface.

A pair of coupling pieces 16 bent upward are continuously provided on the left and right edges of the body horizontal plate portion 15 extending forward from the plate-shaped fixing portion 12. The coupling pieces 16 are each formed with a through hole 18, which is a locking portion for increasing a coupling strength between the coupling pieces 16 and resin portions 38 of the housing 31 covering the coupling pieces 16.

The body rising plate portion 19 is formed by bending the body horizontal plate portion 15 at 90° in a rising direction at a bent portion 20. A bending angle of the bent portion 20 is not limited to 90°, and can be appropriately changed according to a shape around the ground surface to which the plate-shaped fixing portion 12 is screwed and fixed, and the fitting direction of the counterpart connector 51.

Further, the bent portion 20 is provided with an embossed portion 27 extending over the body horizontal plate portion 15 and the body rising plate portion 19.

At both left and right end portions of the terminal connection portion 21, folding plate portions 22 are continuously provided to the terminal connection portion 21 respectively, and the folding plate portion 22 folded forward is overlapped with the terminal connection portion 21.

Dowels 25 protruding toward the terminal connection portion 21 side are formed in the respective folding plate portions 22 by dowel processing. By fitting the dowels 25 into holes 24 formed in the terminal connection portion 21, the folding plate portions 22 are restricted from being displaced with respect to the terminal connection portion 21.

A plurality of terminal connecting portions 26 protrude in the same direction from upper and lower edges of the folding plate portion 22. In the ground terminal member 11, the plurality of terminal connecting portions 26 protruding forward in a plane perpendicular to a plane of the body rising plate portion 19 are arranged in two stages in the upper-lower direction.

As shown in FIGS. 3 and 4, in the housing 31 in which the ground terminal member 11 is insert-molded, a housing body portion 32 including the lock portion 39 and the fitting recessed portion 33 into which the counterpart fitting portion 53 of the counterpart housing 52 is fitted, and a pair of reinforcing rib portions 35 are integrally molded.

That is, in the housing body portion 32, the body rising plate portion 19 and the terminal connection portion 21 are insert-molded in a state in which the plurality of terminal connecting portions 26 protrude into the fitting recessed portion 33. Further, the pair of reinforcing rib portions 35 are integrally formed with the housing body portion 32 so as to connect the resin portions 38 covering the coupling pieces 16 and a resin portion 36 covering the terminal connection portion 21. The resin portions 38 covering the coupling pieces 16 flow into the through holes 18 of the coupling pieces 16 and solidifies, thereby increasing coupling strength between the coupling pieces 16 and the resin portions 38.

Next, a case where the counterpart connector 51 is fitted to the joint connector 1 will be described.

Figure 7:
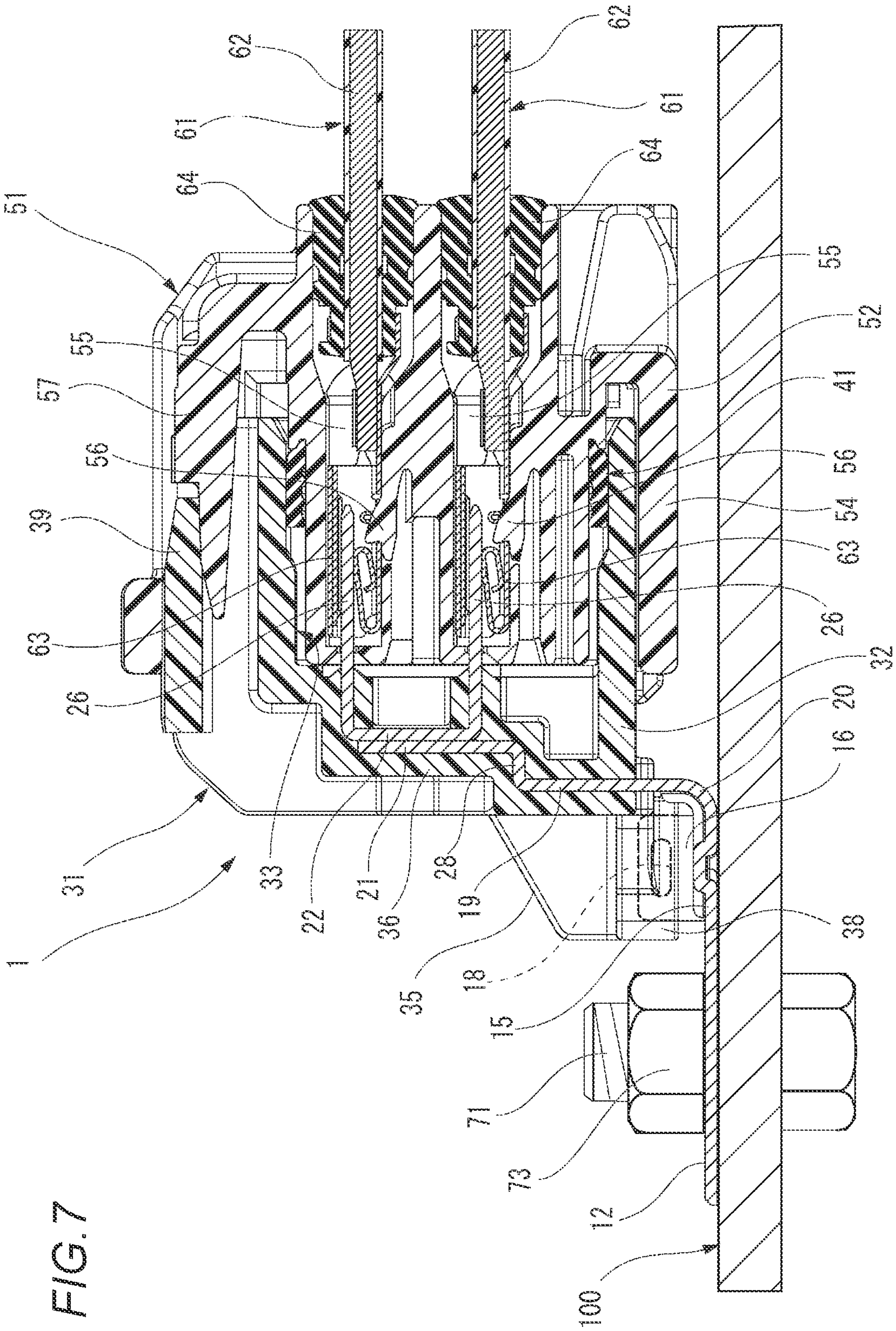
FIG. 7 is a longitudinal sectional view of the counterpart connector and the joint connector which is screwed and fixed to a ground portion of a vehicle.

FIG. 7 is a longitudinal sectional view of the counterpart connector 51 and the joint connector 1 which is screwed and fixed to the body 100 of the vehicle.

In order to fit the counterpart connector 51 to the joint connector 1 which is screwed and fixed to the body 100 of the vehicle, a front end of the counterpart housing 52 of the counterpart connector 51 is brought close to a front end of the housing 31 of the joint connector 1. Then, the counterpart fitting portion 53 of the counterpart housing 52 is inserted into the fitting recessed portion 33 of the housing 31.

Then, as shown in FIG. 7, the terminal connecting portions 26 formed on the ground terminal member 11 of the joint connector 1 are conductively connected to the counterpart terminals 63 accommodated in the terminal accommodating chamber 55 of the counterpart housing 52, and the electric wires 62 are electrically connected to the ground terminal member 11. The electric wires 62 are also electrically connected to each other via the ground terminal member 11. In this state, the lock arm 57 locks the lock portion 39, and the housing 31 and the counterpart housing 52 are locked to each other in a state of being fitted.

Therefore, according to the joint connector 1 of the present embodiment described above, the coupling pieces 16 and the terminal connection portion 21 of the ground terminal member 11 are insert-molded in the housing 31, so that the resin portions 38 covering the coupling pieces 16 and the resin portion 36 covering the terminal connection portion 21 are coupled by the reinforcing rib portions 35. That is, the body horizontal plate portion 15 and the body rising plate portion 19 are obliquely reinforced by the reinforcing rib portions 35 like an angle brace.

Therefore, even when the joint connector 1 tends to swing about the bent portion 20 of the ground terminal member 11 as a fulcrum, an angle formed by the body horizontal plate portion 15 and the body rising plate portion 19 is held by the reinforcing rib portions 35, thereby restricting the swinging. Therefore, elastic deformation does not occur repeatedly at the bent portion 20 of the ground terminal member 11.

Accordingly, even if vibration is applied to the joint connector 1 due to vibration during traveling and the like of the vehicle, deformation and breakage occurring in the bent portion 20 of the ground terminal member 11 can be prevented.

Further, according to the joint connector 1 of the present embodiment, the coupling strength between the coupling piece 16 and the resin portion 38 covering the connecting piece 16 is increased by the through hole 18 provided in the coupling piece 16. Therefore, it is possible to prevent the reinforcing rib portion 35 from coming off the coupling piece 16 due to vibration or the like applied to the joint connector 1.

The locking portion of the present disclosure is not limited to the through hole 18, and various forms such as a notch and a bending protrusion can be adopted based on the gist of the present disclosure.

Further, according to the joint connector 1 of the present embodiment, the bent portion 20 is provided with the embossed portion 27 extending over the body horizontal plate portion 15 and the body rising plate portion 19. Therefore, when the joint connector 1 is handled by conveyance or the like, even if an external force is applied to the ground terminal member 11, deformation of the bent portion 20 is prevented, and the angle formed by the body horizontal plate portion 15 and the body rising plate portion 19 is maintained.

Further, according to the joint connector 1 of the present embodiment, the housing 31 includes, in the housing body portion 32, the fitting recessed portion 33 into which the counterpart fitting portion 53 of the counterpart housing 52 having the plurality of terminal accommodating chambers 55 each accommodating the counterpart terminal 63 is fitted, and the plurality of terminal connecting portions 26 protrude into the fitting recessed portion 33. Therefore, by screwing and fixing the joint connector 1 to the body 100 of the vehicle and fitting the counterpart fitting portion 53 of the counterpart housing 52 into the fitting recessed portion 33 of the housing body portion 32, the plurality of electric wires 62 electrically connected to the counterpart terminals 63 can be collectively grounded to the body 100 of the vehicle via the plurality of terminal connecting portions 26 of the ground terminal member 11.

Therefore, according to the joint connector 1 of the present embodiment, it is possible to prevent deformation and breakage occurring in the bent portion 20 of the ground terminal member 11.

It should be noted that the present disclosure is not limited to the above embodiment, and modifications, improvements, and the like can be made as appropriate. In addition, materials, shapes, dimensions, numbers, arrangement locations, and the like of the respective constituent elements in the above embodiment are optionally selected and are not limited as long as the present disclosure can be implemented.

The housing 31 of the above-described embodiment, includes, in the housing body portion 32, the fitting recessed portion 33 into which the counterpart fitting portion 53 of the counterpart housing 52 having the plurality of terminal accommodating chambers 55 each accommodating the counterpart terminal 63 is fitted. The terminal connecting portions 26 protruding into the fitting recessed portion 33 are electrically connected to the counterpart terminals 63 of the counterpart housing 52, but the present disclosure is not limited thereto. For example, the housing may include a terminal holding mechanism such as a locking lance or a retainer for holding the counterpart terminal 63 in the housing body portion, and the plurality of terminal connecting portions may be electrically connected to the counterpart terminal held by the terminal holding mechanism.

According to a first aspect of the present disclosure, a joint connector (1) includes: a ground terminal member (11) made of a conductive metal; and a housing (31) made of an insulating resin. The ground terminal member (11) includes: a plate-shaped fixing portion (12) that is fixed to a ground portion of a vehicle (body 100); a body horizontal plate portion (15) that extends from the plate-shaped fixing portion (12); a body rising plate portion (19) that is formed by bending the body horizontal plate portion (15) in a rising direction at a bent portion (20); a terminal connection portion (21) that is provided above the body rising plate portion (19) and that is formed with a plurality of terminal connecting portions (26) electrically connectable with a counterpart terminal (63); and a coupling piece (16) that is continuously provided with the body horizontal plate portion (15). The ground terminal member (11) is configured by integrally forming the plate-shaped fixing portion (12), the body horizontal plate portion (15), the body rising plate portion (19), the terminal connection portion (21), and the coupling piece (16). The housing (31) includes: a housing body portion (32) in which the body rising plate portion (19) and the terminal connection portion (21) are insert-molded in a state in which the plurality of terminal connecting portions (26) are protruded for connecting the counterpart terminal (63); and a reinforcing rib portion (35) provided to couple a first resin portion (38) covering the coupling piece (16) and a second resin portion (36) covering the terminal connection portion (21). The housing (31) is configured by integrally forming the housing body portion (32) and the reinforcing rib portion (35).

According to the joint connector (1) having the configuration of the first aspect, the coupling pieces (16) and the terminal connection portion (21) of the ground terminal member (11) are insert-molded in the housing (31), so that the resin portions (38) covering the coupling pieces (16) and the resin portion (36) covering the terminal connection portion (21) are coupled by the reinforcing rib portions (35). That is, the body horizontal plate portion (15) and the body rising plate portion (19) are obliquely reinforced by the reinforcing rib portions (35) like an angle brace.

Therefore, even when the joint connector (1) tends to swing about the bent portion (20) of the ground terminal member (11) as a fulcrum, an angle formed by the body horizontal plate portion (15) and the body rising plate portion (19) is held by the reinforcing rib portions (35), thereby restricting the swinging. Therefore, elastic deformation does not occur repeatedly at the bent portion (20) of the ground terminal member (11).

Accordingly, even if vibration is applied to the joint connector (1) due to vibration during traveling and the like of the vehicle, deformation and breakage occurring in the bent portion (20) of the ground terminal member (11) can be prevented.

According to a second aspect of the present disclosure, the coupling piece (16) has a locking portion (through hole 18) for increasing a coupling strength between the coupling piece (16) and the first resin portion (38) covering the coupling piece (16).

According to the joint connector (1) having the configuration of the second aspect, the coupling strength between the coupling piece (16) and the resin portion (38) covering the connecting piece (16) is increased by the locking portion (through hole 18) provided in the coupling piece (16). Therefore, it is possible to prevent the reinforcing rib portion (35) from coming off the coupling piece (16) due to vibration or the like applied to the joint connector (1).

According to a third aspect of the present disclosure, the bent portion (20) is provided with an embossed portion (27) extending over the body horizontal plate portion (15) and the body rising plate portion (19).

According to the joint connector (1) having the configuration of the third aspect, when the joint connector (1) is handled by conveyance or the like, even if an external force is applied to the ground terminal member (11), deformation of the bent portion (20) is prevented, and the angle formed by the body horizontal plate portion (15) and the body rising plate portion (19) is maintained.

According to a fourth aspect of the present disclosure, the housing body portion (31) includes a fitting recessed portion (33) configured to fit with a counterpart fitting portion (53) of a counterpart housing (52) having a plurality of terminal accommodating chambers (55) each accommodating the counterpart terminal (63). The plurality of terminal connecting portions (26) protrude inside the fitting recessed portion (33).

According to the joint connector (1) having the configuration of the fourth aspect, by screwing and fixing the joint connector (1) to the ground portion (body 100) of the vehicle and fitting the counterpart fitting portion (53) of the counterpart housing (52) into the fitting recessed portion (33) of the housing body portion (32), the plurality of electric wires (62) electrically connected to the counterpart terminals (63) can be collectively grounded to the ground portion (body 100) of the vehicle via the plurality of terminal connecting portions (26) of the ground terminal member (11).

According to the joint connector of the present disclosure, it is possible to prevent deformation and breakage occurring in a bent portion of a ground terminal member.

What is claimed is:

1. A joint connector comprising:

a ground terminal member made of a conductive metal; and a housing made of an insulating resin, wherein the ground terminal member includes:

a plate-shaped fixing portion that is fixed to a ground portion of a vehicle;

a body horizontal plate portion that extends from the plate-shaped fixing portion;

a body rising plate portion that is formed by bending the body horizontal plate portion in a rising direction at a bent portion;

a terminal connection portion that is provided above the body rising plate portion and that is formed with a plurality of terminal connecting portions electrically connectable with a counterpart terminal; and a coupling piece that is continuously provided with the body horizontal plate portion, the ground terminal member is configured by integrally forming the plate-shaped fixing portion, the body horizontal plate portion, the body rising plate portion, the terminal connection portion, and the coupling piece, the housing includes:

a housing body portion in which the body rising plate portion and the terminal connection portion are insert-molded in a state in which the plurality of terminal connecting portions are protruded for connecting the counterpart terminal; and a reinforcing rib portion provided to couple a first resin portion covering the coupling piece and a second resin portion covering the terminal connection portion, and the housing is configured by integrally forming the housing body portion and the reinforcing rib portion.

2. The joint connector according to claim 1, wherein the coupling piece has a locking portion for increasing a coupling strength between the coupling piece and the first resin portion covering the coupling piece.

3. The joint connector according to claim 1, wherein the bent portion is provided with an embossed portion extending over the body horizontal plate portion and the body rising plate portion.

4. The joint connector according to claim 1, wherein the housing body portion includes a fitting recessed portion configured to fit with a counterpart fitting portion of a counterpart housing having a plurality of terminal accommodating chambers each accommodating the counterpart terminal, and the plurality of terminal connecting portions protrude inside the fitting recessed portion.

* * * * *